(12) United States Patent
Bachman et al.

(10) Patent No.: US 8,746,959 B2
(45) Date of Patent: Jun. 10, 2014

(54) APPARATUS AND METHOD TO FEED LIVESTOCK

(75) Inventors: Stephen E. Bachman, Amarillo, TX (US); Michael E. Bachman, Reno, NV (US)

(73) Assignee: Ganado Technologies Corp., Canyon, TX (US)

( * ) Notice: Subject to any disclaimer, the term of this patent is extended or adjusted under 35 U.S.C. 154(b) by 836 days.

(21) Appl. No.: 12/181,203

(22) Filed: Jul. 28, 2008

(65) Prior Publication Data

US 2009/0027995 A1 Jan. 29, 2009

Related U.S. Application Data (60) Provisional application No. 60/952,210, filed on Jul. 26, 2007.

(51) Int. Cl.
*B01F 15/02* (2006.01)
*B01F 15/04* (2006.01)

(52) U.S. Cl.
USPC ............ 366/132; 366/151.1; 366/152.1; 366/152.2; 366/152.6; 366/153.1; 366/160.1; 366/160.5; 366/162.1; 366/162.2; 366/181.3

(58) Field of Classification Search
USPC ......... 366/132, 151.1, 152.1, 152.2, 152.6, 366/153.1, 160.1, 160.5, 162.1, 162.2, 366/181.3, 603
See application file for complete search history.

(56) References Cited

U.S. PATENT DOCUMENTS

| | | | |
|---|---|---|---|
| 1,694,442 A | 12/1928 | Gustafson | |
| 2,984,386 A | 5/1961 | White | |
| 3,245,584 A * | 4/1966 | Linville | 222/57 |
| 3,393,899 A | 7/1968 | Wells | |
| 3,806,001 A * | 4/1974 | Pratt | 222/132 |
| 4,812,047 A | 3/1989 | Baumann | |
| 4,891,097 A | 1/1990 | Hyoty et al. | |
| 5,008,821 A * | 4/1991 | Pratt et al. | 119/51.02 |
| 5,139,792 A * | 8/1992 | Ware et al. | 426/2 |
| 5,380,485 A | 1/1995 | Takahashi et al. | |
| 5,462,354 A * | 10/1995 | Neier | 366/314 |
| 6,263,833 B1 * | 7/2001 | Runyan et al. | 119/51.11 |
| 6,343,285 B1 | 1/2002 | Tanaka et al. | |
| 6,484,079 B2 | 11/2002 | Buckelew et al. | |
| 7,367,361 B2 | 5/2008 | Steingass | |
| 7,489,993 B2 | 2/2009 | Coffee et al. | |
| 2002/0015354 A1 * | 2/2002 | Buckelew | 366/2 |
| 2003/0076736 A1 * | 4/2003 | Buker et al. | 366/132 |
| 2004/0028808 A1 | 2/2004 | Williams et al. | |
| 2009/0027995 A1 | 1/2009 | Bachman et al. | |

OTHER PUBLICATIONS

International Search Report and Written Opinion dated Mar. 14, 2011.

* cited by examiner

*Primary Examiner* — Katarzyna Wyrozebski Lee
*Assistant Examiner* — Matthew Hoover
(74) *Attorney, Agent, or Firm* — Dale F. Regelman; Quarles & Brady LLP (57) ABSTRACT

A portable feed apparatus comprising a feed container, a mixing assembly that receives a feed from said feed container, at least one feed additive assembly in flowable connection with said mixing assembly, and a controller in communication with said mixing assembly.

9 Claims, 12 Drawing Sheets

| | PHYSICAL LOCATION | GPS LOCATION | TARGET WEIGHT BASE FEED | ACTUAL WEIGHT BASE FEED | ADDITIVE A NOMINAL DELIVERY WINDOW | ADDITIVE A ALERT ? | TARGET WEIGHT PERCENT ADDITIVE A | ACTUAL WEIGHT PERCENT ADDITIVE A | ADDITIVE A NOMINAL DELIVERY WINDOW | ADDITIVE A ALERT ? | ••• |
|---|---|---|---|---|---|---|---|---|---|---|---|
| FORMULATION NUMBER 1 | NORTH FEED BUNK | 33.3078333 111.6554722 | 1000 POUNDS | 950 POUNDS | +/- 10% | NO | 5 | 3 | +/- 10% | YES | |
| FORMULATION NUMBER 2 | | | | | | | | | | | |
| FORMULATION NUMBER 3 | | | | | | | | | | | |
| • • • | | | | | | | | | | | |
| FORMULATION NUMBER N | | | | | | | | | | | |

APPARATUS AND METHOD TO FEED LIVESTOCK

CROSS-REFERENCE TO RELATED APPLICATION

This application incorporates by reference and claims priority to U.S. Provisional Application Ser. No. 60/952,210, which was filed on Jul. 26, 2007.

BACKGROUND OF THE INVENTION

Figure 1A:
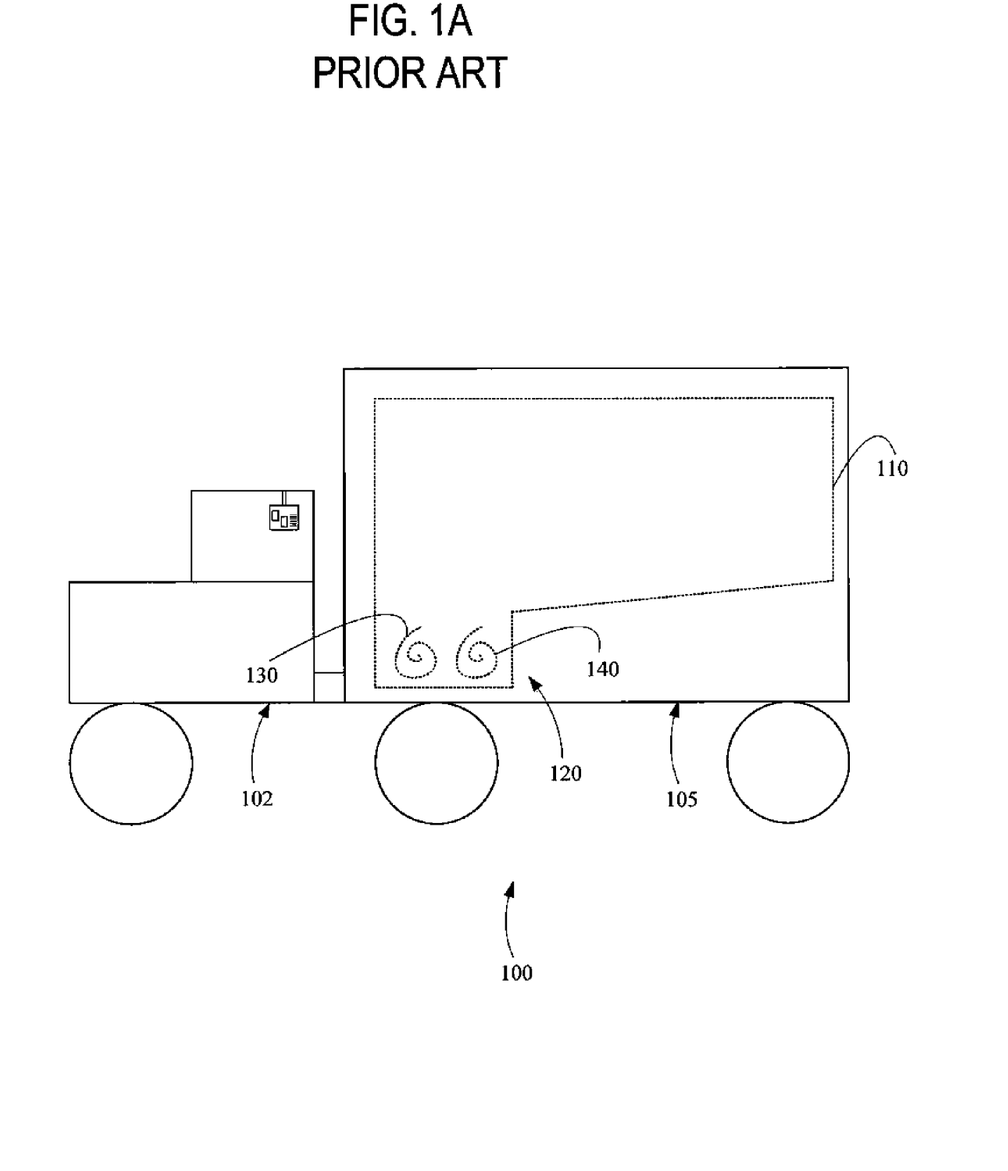
FIGS. 1A-1C illustrate prior art apparatus.

FIG. 1A illustrates a prior art apparatus to feed livestock. Vehicle 100 comprises cab portion 102 and trailer portion 105. In certain embodiments, cab 102 and trailer 105 comprise an integral manufacture.

Figure 1B:
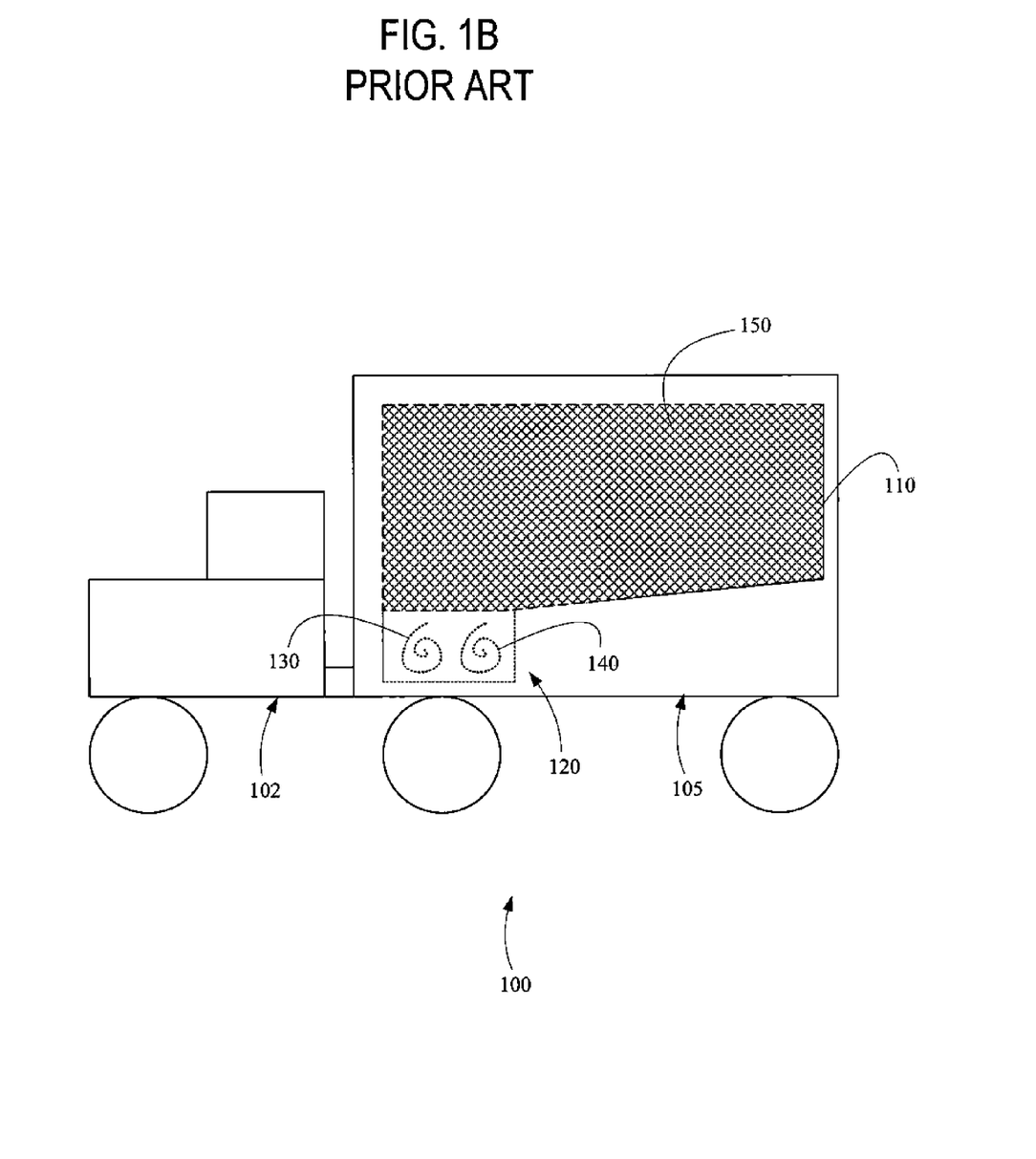

Trailer portion 105 comprises feed container 110 and delivery assembly 120 disposed therein. Referring now to FIGS. 1A and 1B, feed 150 is disposed in feed container 110 and is gravity feed into delivery assembly 120. In the illustrated embodiment of FIGS. 1A and 1B, delivery assembly 120 comprises a first auger 130 and a second auger 140. In other embodiments, delivery assembly 120 may comprise a single auger. In still other embodiments, delivery assembly 120 comprises a more than 2 augers. In certain embodiments, multiple augers may operate in a counter-rotating fashion.

Figure 1C:
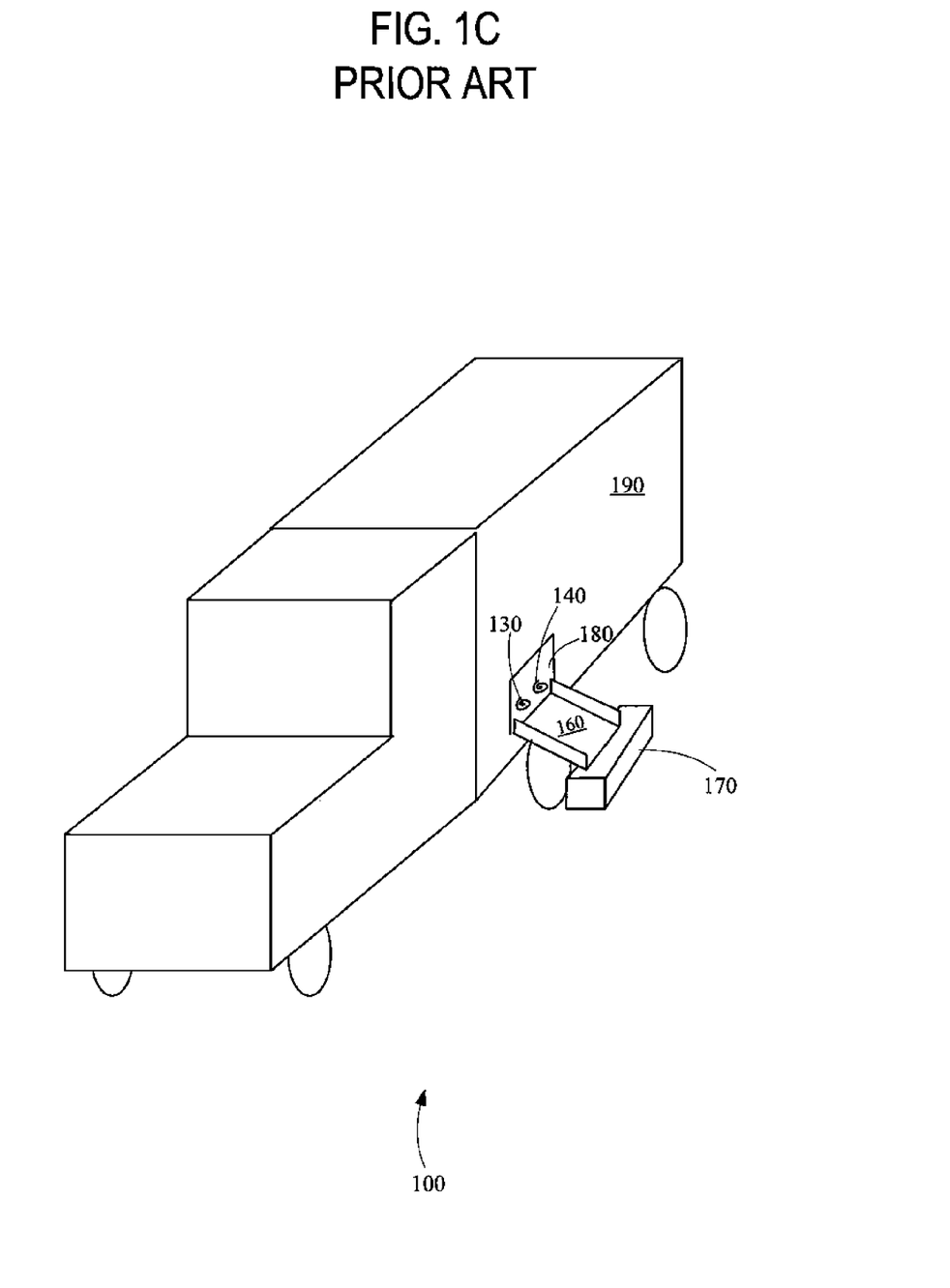

Referring now to FIG. 1C, vehicle 100 is driven to a livestock feeding site and positioned such that feed trailer 105 is disposed adjacent feed bunk 170. Side 190 of feed trailer 105 is formed to include aperture 180. Delivery assembly 120 is energized, and feed 150 is transferred from feed container 110, through aperture 180, across chute 160 and into feed bunk 170.

The prior art apparatus of FIGS. 1A, 1B, and 1C, can deliver the same feed formulation to a plurality of feeding locations. However, different formulations cannot be delivered to different locations.

SUMMARY OF THE INVENTION

Applicants' invention comprises a portable feed preparation apparatus. The portable feed apparatus comprises a feed container, a mixing assembly that receives a feed from said feed container, at least one feed additive assembly in flowable connection with said mixing assembly, and a controller in communication with said mixing assembly.

The invention further comprises a method using Applicants' portable feed preparation apparatus to prepare a feed composition specific to a designated feeding site. The invention further comprises an article of manufacture comprising a computer readable medium comprising computer readable code to implement Applicants' method.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment" and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The prior art apparatus of FIGS. 1A, 1B, and 1C does not permit variations of the feed formulation. What is needed is a mobile apparatus that can provide a plurality of food formulations at a plurality of feeding stations.

Applicants' apparatus, and method using that apparatus, can provide a plurality of feed formulations at a plurality of feeding locations, logs the actual amounts and formulations provided, and optionally generates an alert if an actual delivered quantity differs from a pre-set target quantity, and/or if an actual delivered feed formulation differs from a pre-set target feed formulation.

Applicants' apparatus can be disposed on either the exterior or interior of a prior art feed trailer 105. In the alternative, Applicants' apparatus can be incorporated into a new article of manufacture.

Figure 2A:
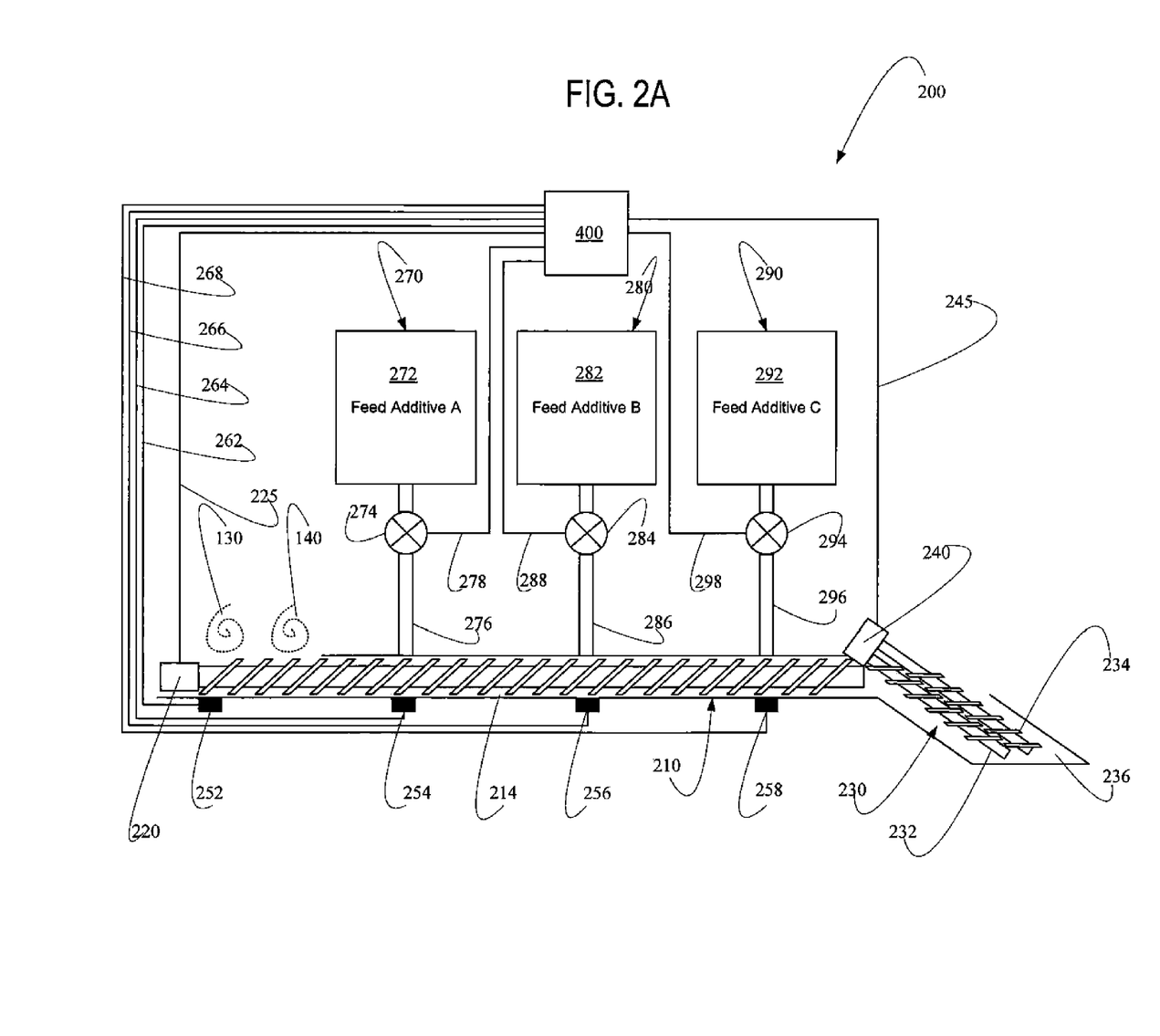
FIG. 2A schematically depicts one embodiment of Applicants' food preparation apparatus.
Figure 2B:
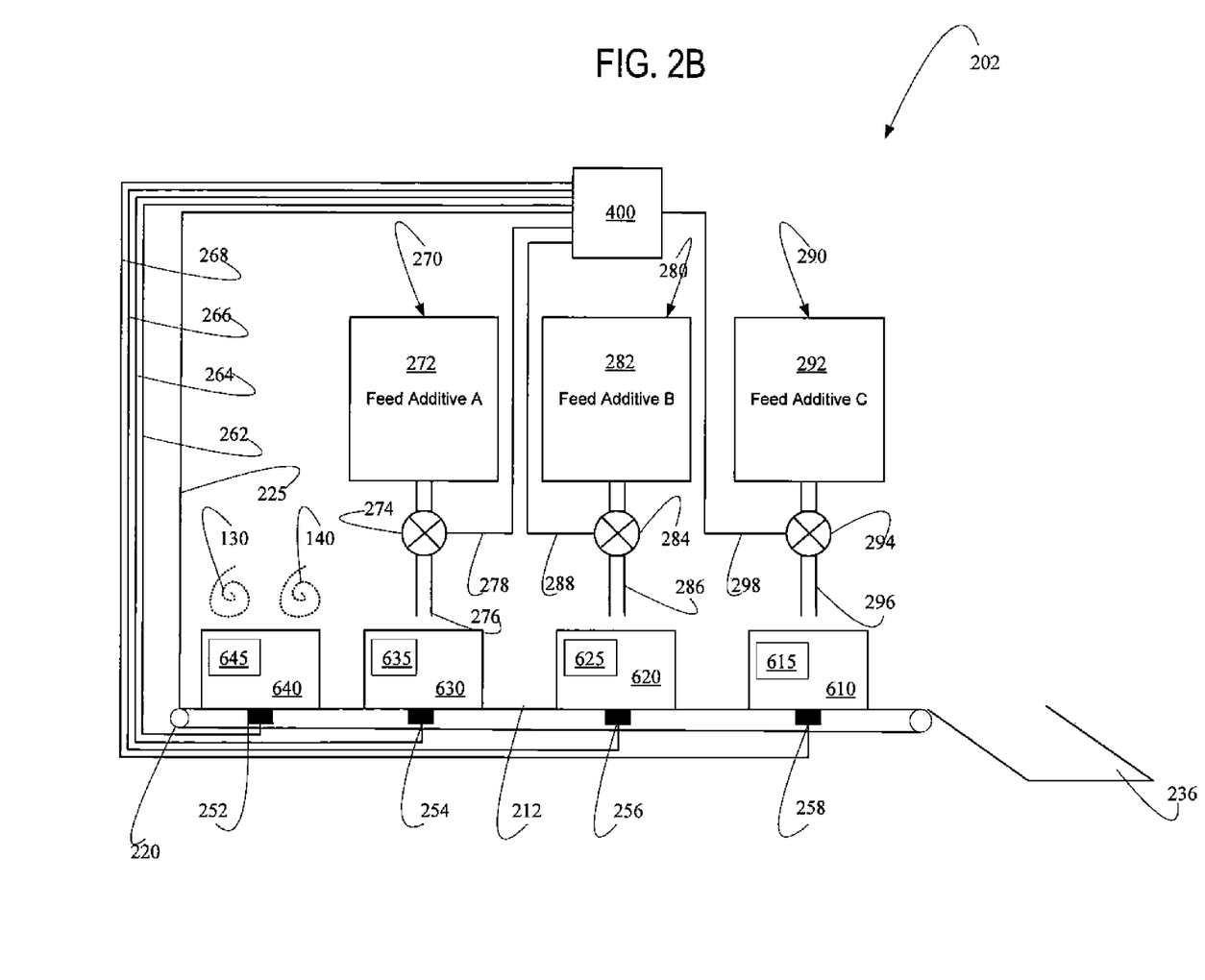
FIG. 2B schematically depicts a second embodiment of Applicants' food preparation apparatus.

FIG. 2A illustrates embodiment 200 of Applicants' portable feed preparation apparatus. FIG. 2B illustrates embodiment 202 of Applicants' portable feed preparation apparatus.

In the illustrated embodiment of FIG. 2A, Applicants' portable feed preparation apparatus 200 comprises mixing assembly 210, motor 220, delivery auger assembly 230, motor 240, first measurement device 252, second measurement device 254, third measurement device 256, and fourth measurement device 258, first feed additive assembly 270, second feed additive assembly 280, third feed additive assembly 290, and controller 400.

Communication link 262 interconnects first measurement device 252 and controller 400. Communication link 264 interconnects second measurement device 254 and controller 400. Communication link 266 interconnects third measurement device 256 and controller 400. Communication link 268 interconnects fourth measurement device 258 and controller 400.

Feed augers 130 and 140 deliver feed 150 from feed container 110 (as shown in FIG. 1B) into mixing assembly 210. Mixing assembly 210 comprises mixing auger 214 disposed within mixing assembly 210. In certain embodiments, motor 220 can cause mixing auger 214 to rotate within mixing assembly 210 thereby conveying feed from input augers 130 and 140 to output auger assembly 230. Motor 220 is interconnected with controller 400 by communication link 225.

Motor 240 causes augers 232 and 234 to rotate, thereby conveying feed 150 in optional combination with one or more of Feed Additive "A", and/or Feed Additive "B", and/or Feed Additive "C," from augers 130/140 to chute 236. In certain embodiments, Feed Additives A, B, and C, are selected from the group consisting of vitamins, parasiticides, antibiotics, probiotics, growth promoters, and the like.

Motor 240 is interconnected with, and controlled by, controller 400 via communication link 245. In the illustrated embodiment of FIG. 2, delivery auger assembly 230 comprises first auger 232 and second auger 234. In other embodiments, delivery auger assembly 230 comprises a single auger.

Feed additive assembly 270 comprises container 272, valve 274, conduit 276, and communication link 278. Conduit 276 interconnects valve 274 and mixing assembly 210. Communication link 278 interconnects valve 274 and controller 400. In certain embodiments, valve 274 comprises a totalizer, wherein that totalizer determines the weight of Feed Additive A passing through valve 274. In these embodiments, the weight of Feed Additive A added to the feed is communicated to controller 400 via communication link 278.

Feed additive assembly 280 comprises container 282, valve 284, conduit 286, and communication link 288. Conduit 286 interconnects valve 284 and mixing assembly 210. Communication link 288 interconnects valve 284 and controller 400. In certain embodiments, valve 284 comprises a totalizer, wherein that totalizer determines the weight of Feed Additive B passing through valve 284. In these embodiments, the weight of Feed Additive B added to the feed is communicated to controller 400 via communication link 288.

Feed additive assembly 290 comprises container 292, valve 294, conduit 296, and communication link 978. Conduit 296 interconnects valve 294 and mixing assembly 210. Communication link 298 interconnects valve 294 and controller 400. In certain embodiments, valve 294 comprises a totalizer, wherein that totalizer determines the weight of Feed Additive C passing through valve 294. In these embodiments, the weight of Feed Additive C added to the feed is communicated to controller 400 via communication link 298.

In the illustrated embodiment of FIG. 2A, Applicants' apparatus comprises three feed additive assemblies. In other embodiments, Applicants' apparatus comprises more than three feed additive assemblies. In still other embodiments, Applicants' apparatus comprises fewer than three feed additive assemblies.

In certain embodiments, mixing assembly 210 is mounted on a weight-sensitive platform equipped with a weigh cell 252. In these embodiments, the weigh cell output is integrated over short time intervals to give a rate of flow and total flow.

In certain embodiments, measurement device 252 comprises a Doppler flow meter. Doppler flow meters emit ultrasonic signals into a flow path. To use the Doppler effect to measure flow in a pipe, one transducer transmits an ultrasonic beam into the mixing assembly 210. The movement of materials alters the frequency of the beam reflected onto a second, receiving transducer. The frequency shift is linearly proportional to the rate of flow of materials, and therefore, can be used to develop an analog or digital signal proportional to flow rate.

In the illustrated embodiment of FIG. 2A, mixing assembly 210 is further mounted on a weight-sensitive platform equipped with a weigh cells 254, 256, and 258. In these embodiments, each weigh cell output is integrated over short time intervals to give a rate of flow and total flow.

In certain embodiments, weigh cells 254, 256, and 258, comprise Doppler flow meters. Doppler flow meters emit ultrasonic signals into a flow path. To use the Doppler effect to measure flow in a pipe, one transducer transmits an ultrasonic beam into the mixing assembly 210. The movement of materials alters the frequency of the beam reflected onto a second, receiving transducer. The frequency shift is linearly proportional to the rate of flow of materials, and therefore, can be used to develop an analog or digital signal proportional to flow rate.

In the illustrated embodiment of FIG. 2B, Applicants' portable feed preparation apparatus 202 first measurement device 252, second measurement device 254, third measurement device 256, and fourth measurement device 258, first feed additive assembly 270, second feed additive assembly 280, third feed additive assembly 290, and controller 400. Portable feed preparation apparatus 202 further comprises motor 220 which continuously moves circular belt 212. In the illustrated embodiment of FIG. 2B, portable feed bins 610, 620, 630, and 640, are shown disposed on moveable belt 212.

In the illustrated embodiment of FIG. 2I, an operator places portable feed bins 610, 620, 630, and 640, one at a time, onto moveable belt 212. Augers 130 and 140 deliver feed 150 into those portable feed bins. Measurement device 252 determines the weight of feed added, and provides that weight to controller 400.

Each portable feed bin 610, 620, 630, and 640, is then moved sequentially past the discharge ends of conduits 276, 286, and 296. Controller 400 operates valves 274, 284, and 294, to regulate the amount of Feed Additives A, B, and/or C added to each of portable feed bins 610, 620, 630, and 640. Measurement devices 254, 256, and 258, determine the weights of the various Feed Additives added, and provide those weights to controller 400. The portable feed bins eventually slide, one at a time, down chute 236 to the distal end of the chute.

In certain embodiments, portable feed bin 610 comprises display apparatus 615. Similarly, portable feed bins 620, 630, and 640, comprise display apparatus 625, 635, and 645, respectively. In certain embodiments, display apparatus 615 is in wireless communication with controller 400. In certain embodiments, display apparatus 615 visually displays the weight percentage of feed 150 disposed in portable feed bin 610, the weight percentage of Feed Additive A disposed in portable feed bin 610, the weight percentage of Feed Additive B disposed in portable feed bin 610, and the weight percentage of Feed Additive C disposed in portable feed bin 610.

Figure 2C:
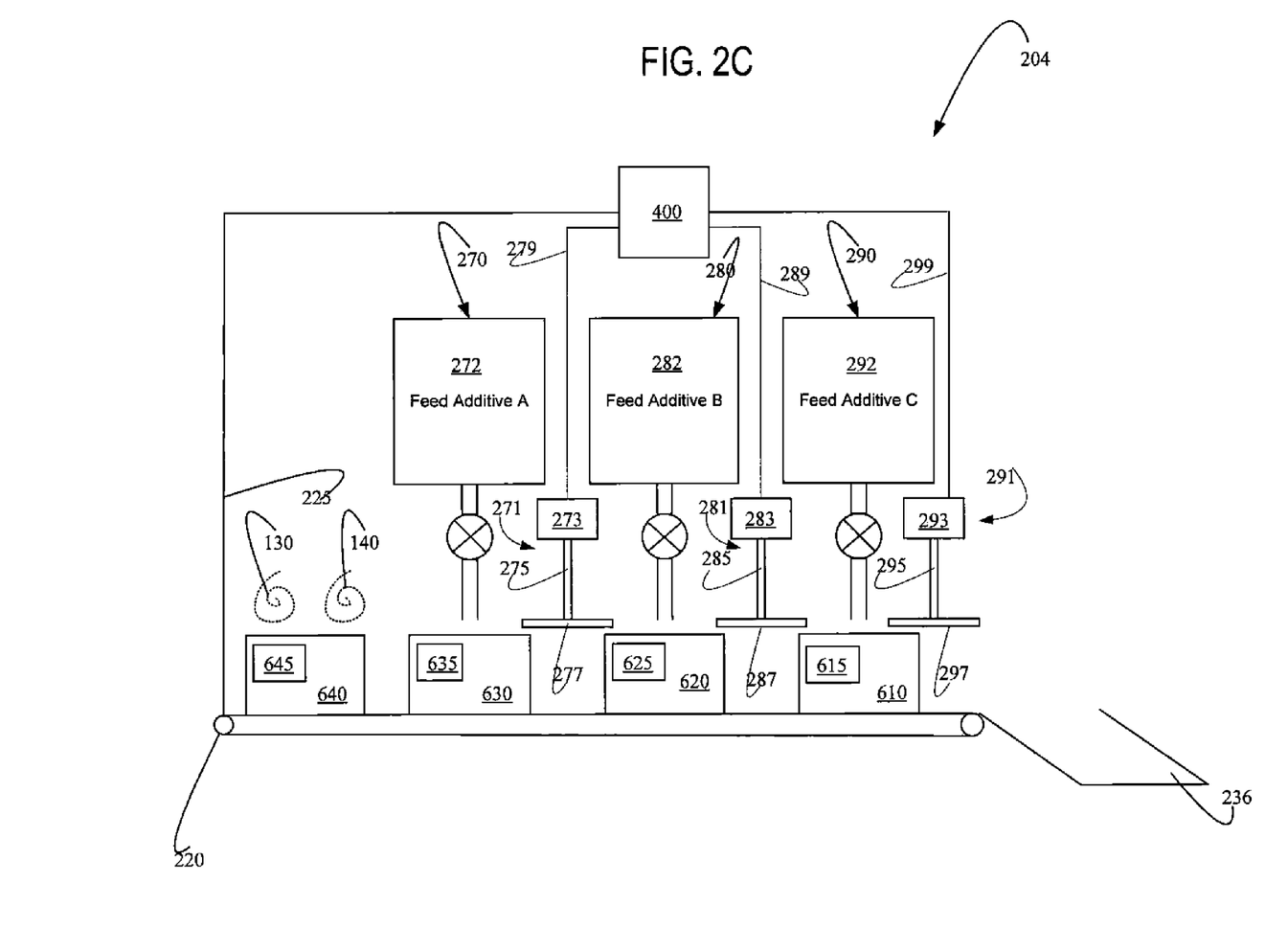
FIG. 2C schematically depicts a third embodiment of Applicants' food preparation apparatus.

Referring now to FIG. 2C, Applicants' portable feed preparation apparatus 204 comprises the elements of apparatus 202 (FIG. 2B), and further comprises mixing apparatus 271, mixing apparatus 281, and mixing apparatus 291. Mixing apparatus 271 comprises motor 273, mixing shaft 275 attached to motor 273 and extending downwardly therefrom, and a plurality of mixing blades 277 attached to a distal end of mixing shaft 275. Motor 273 is in communication with controller 400 via communication link 279.

After a designated quantity of Feed Additive A is added to a portable feed bin, motor 220 moves belt 212 such that the portable feed bin is positioned beneath mixing apparatus 271. Controller 400 then lowers mixing apparatus 271 such that the plurality of mixing blades 277 extend into the feed 150/Feed Additive A mixture. Controller 400 then energizes motor 273 which rotates mixing shaft 275 thereby causing the one or more mixing blades 277 to mix the ingredients disposed in the portable feed bin.

Similarly, after a designated quantity of Feed Additive B is added to a portable feed bin, motor 220 moves belt 212 such that the portable feed bin is positioned beneath mixing apparatus 281. Controller 400 then lowers mixing apparatus 281 such that the plurality of mixing blades 287 extend into the feed 150/Feed Additive A/Feed Additive B mixture. Controller 400 then energizes motor 283 which rotates mixing shaft 285 thereby causing the one or more mixing blades 287 to mix the ingredients disposed in the portable feed bin.

Similarly, after a designated quantity of Feed Additive C is added to a portable feed bin, motor 220 moves belt 212 such that the portable feed bin is positioned beneath mixing apparatus 291. Controller 400 then lowers mixing apparatus 291 such that the plurality of mixing blades 297 extend into the feed 150/Feed Additive A/Feed Additive B/Feed Additive C mixture. Controller 400 then energizes motor 293 which rotates mixing shaft 295 thereby causing the one or more mixing blades 297 to mix the ingredients disposed in the portable feed bin.

Figure 3A:
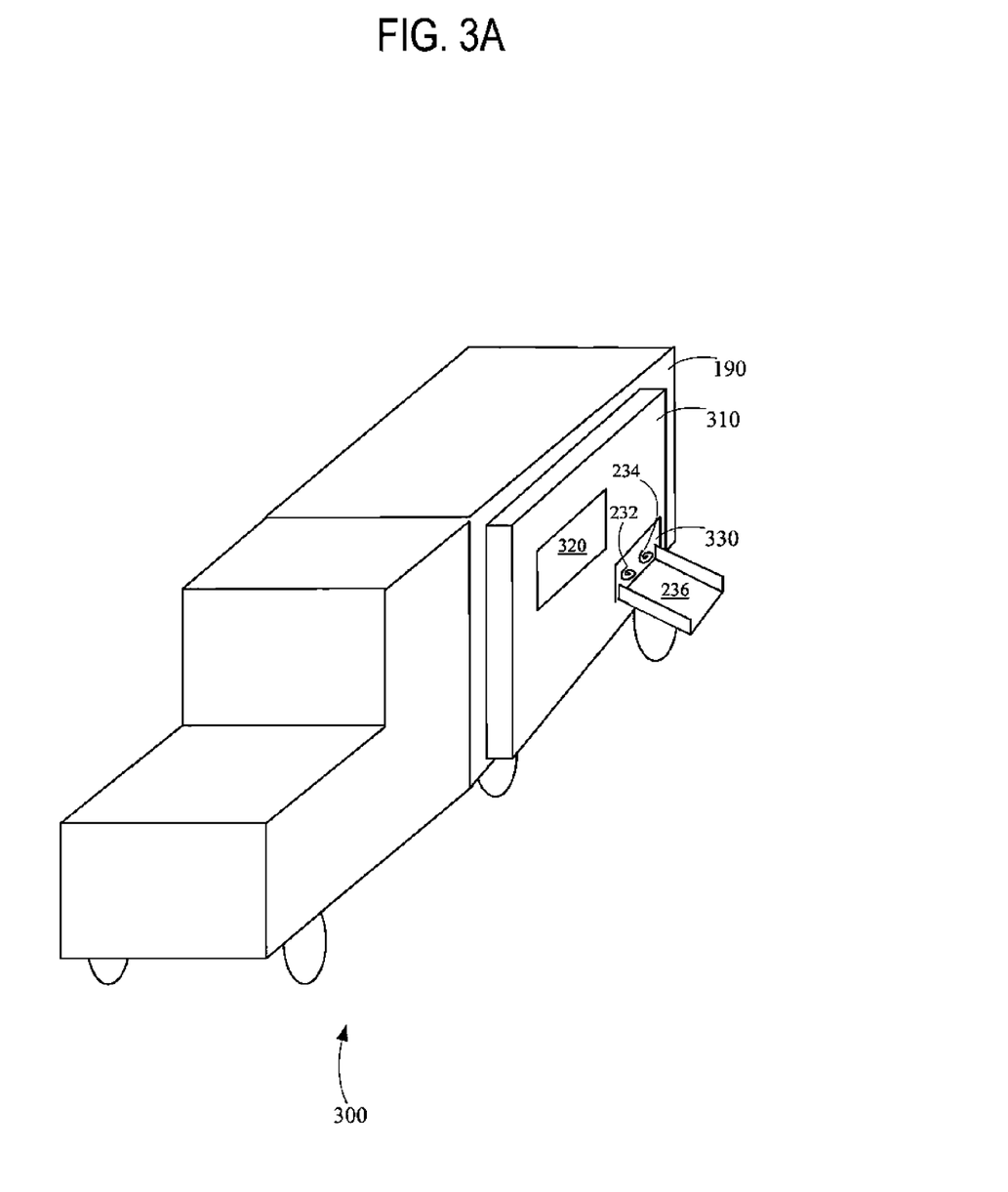
FIG. 3A illustrates Applicants' food preparation apparatus disposed in a wheeled-vehicle comprising an engine.

In the illustrated embodiment of FIG. 3A, Applicants' portable feed preparation apparatus 200 or Applicants' portable feed preparation apparatus 202, is disposed within housing 310. In the illustrated embodiment of FIG. 3A, housing 310 is disposed on the left side of powered/wheeled vehicle 300. In certain embodiments, powered vehicle 300 comprises an internal combustion engine. In other embodiments, housing 310 is disposed on the right side of powered/wheeled vehicle 300. In yet other embodiments, housing 310 is disposed on a rear portion of powered/wheeled vehicle 300.

Figure 3B:
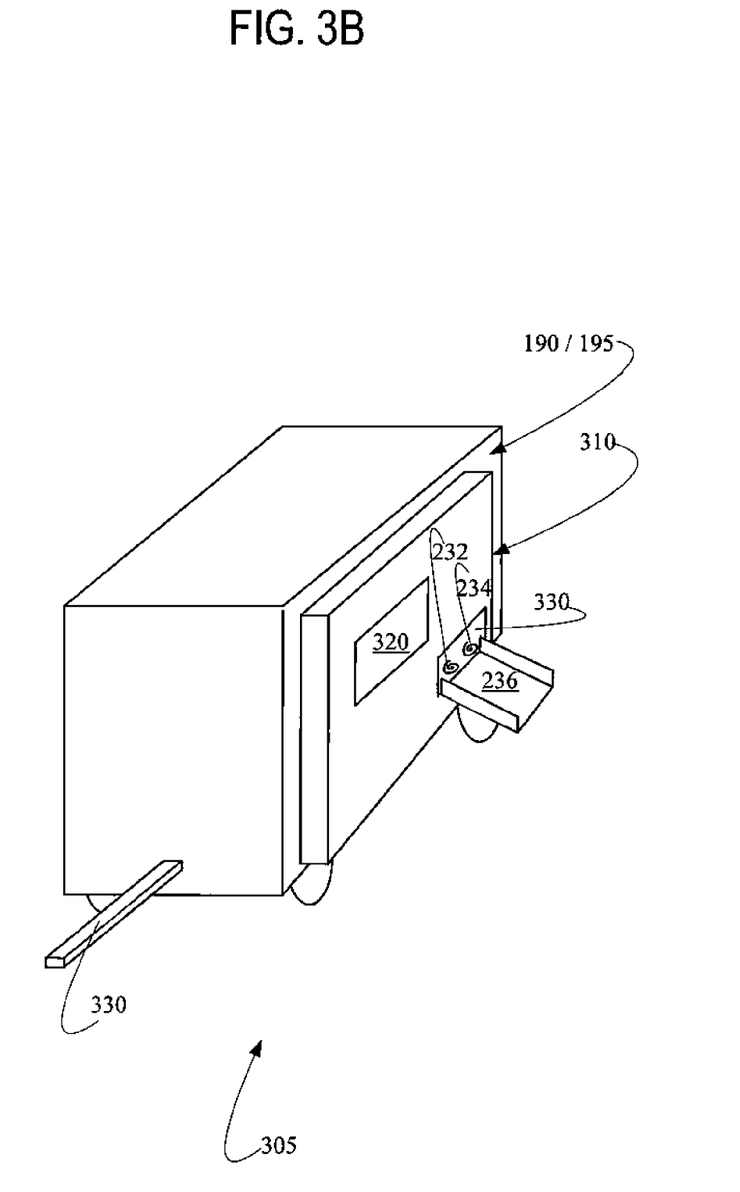
FIG. 3B illustrates Applicants' food preparation apparatus disposed in a wheeled-vehicle that does not comprise an engine.

In the illustrated embodiment of FIG. 3B, housing 310 is disposed on the left side of an unpowered/wheeled vehicle 305, i.e. trailer 305. As those skilled in the art will appreciate, trailer 305 can be releaseably attached to a powered vehicle via trailer arm 330. In other embodiments, housing 310 is disposed on the right side of trailer 305. In yet other embodiments, housing 310 is disposed on a rear portion of trailer 305.

Housing 310 comprises door assembly 320 which permits access to feed additive assemblies 270, 280, and 290, as well as access to controller 400. Housing 310 is formed to include aperture 330 extending therethrough. In the illustrated embodiment of FIG. 3A, feed chute 236 extends outwardly through aperture 330.

Figure 4:
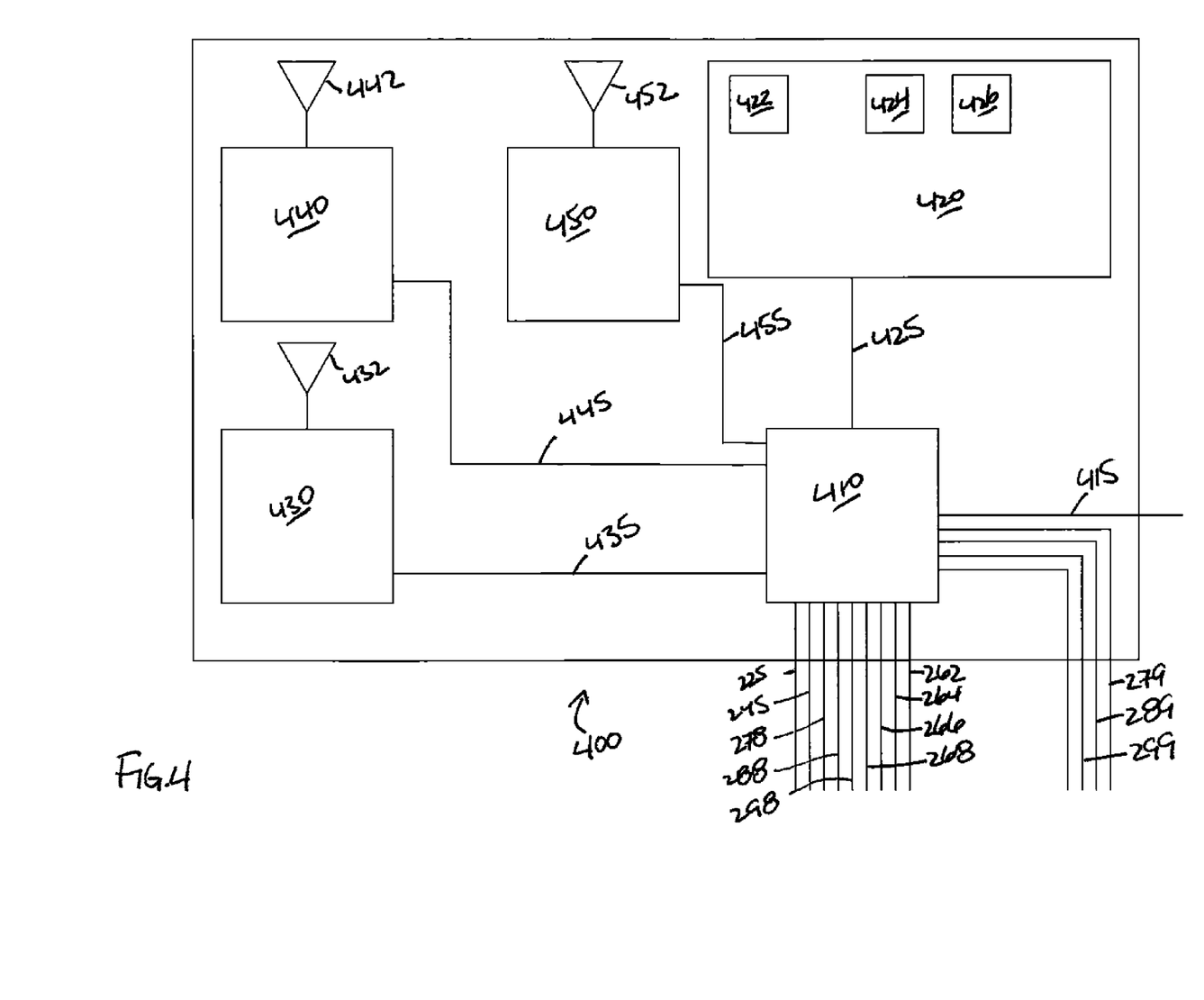
FIG. 4 schematically depicts a controller of the invention.

Referring now to FIG. 4, controller 400 comprises processor 410, memory 420 interconnected with processor 410 via communication link 425, optional GPS module 430 interconnected with processor 410 via communication link 435, optional RFID module 440 interconnected with processor 410 via communication link 445, and optional "WI-FI", module 450 interconnected with processor 410 via communication link 455.

As those skilled in the art will appreciate, GPS module 430 comprises a wireless device that receives a plurality of signals from a plurality of GPS satellites, and determines a location for the GPS device using that plurality of signals. As those skilled in the art will appreciate, WI-FI module 450 comprises a wireless network communication module.

In certain embodiments, processor 410 is interconnected by communication link 415 to an external data input device, such as and without limitation, a pointing device, mouse, keyboard, touch screen, and the like. In the illustrated embodiment of FIG. 3B, external controller 460 is disposed in cab portion of Applicants' feed truck 300. In certain embodiments, external controller 460 communicates with processor 410 via communication link 415. In other embodiments, external controller 460 communicates with processor 410 wirelessly.

In the illustrated embodiment of FIG. 4, microcode 422, instructions 424, and database 426, are encoded in memory 420. In certain embodiments, memory 420 comprises non-volatile memory. In certain embodiments, memory 420 comprises battery backed up RAM, a magnetic hard disk assembly, an optical disk assembly, and/or electronic memory. By "electronic memory," Applicants mean a PROM, EPROM, EEPROM, SMARTMEDIA, FLASHMEDIA, and the like.

Processor 410 uses microcode 422 to operate controller 400. Processor 410 uses microcode 422, instructions 424, and database 426, to operate GPS module 430, RFID module 440, WI-FI module 450, augers 130 and 140, mixing assembly 210, motor 220, delivery assembly 230, measurement devices 252, 254, 256, and 258, and valves 272, 284, and 294.

Referring now to FIGS. 2B, 3C, 4, 6A and 6B, in certain embodiments display apparatus 615 comprises wireless receiver 640, antenna 650, and display device 660. In certain embodiments, display device 660 comprises an LCD display which receives both an information signal and power from wireless receiver 640.

In certain embodiments, wireless receiver 640 comprises an REID device comprising a resonant radio frequency (RE) circuit 642. In the illustrated embodiment of FIG. 6A, resonant circuit 642 comprises coil antenna 644 and a capacitor 646 which together form the resonant circuit 642 with a predetermined resonant frequency, i.e., the selected radio frequency deriving from the values represented by the coil 644 and the capacitor 646.

Figure 6A:
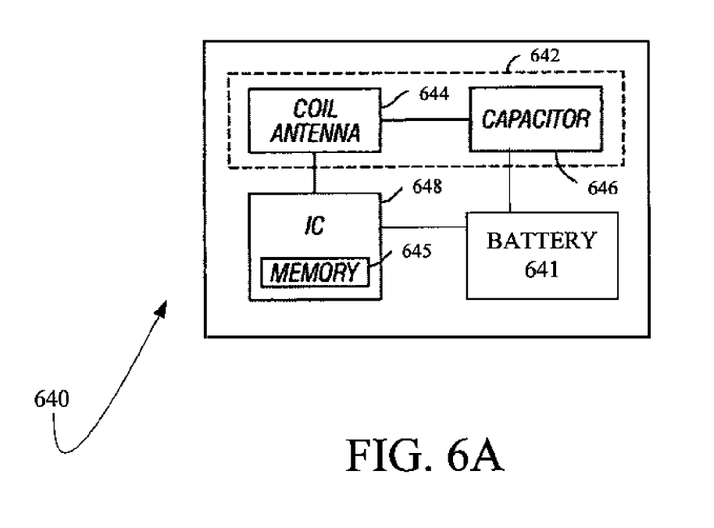
FIG. 6A is a block diagram showing a wireless receiver used in the food preparation apparatus of FIGS. 2B and 2C.

Receiver 640 further includes battery 641 and an integrated circuit (IC 648 which comprises a logic portion. The IC 648 is electrically connected to the resonant circuit 642. It is noted that the capacitor 642 may be either external to the IC 648 or within the IC 648, depending on the desired implementation of the circuit 642. The IC 648 includes a programmable memory 645 for storing information received from RFID module 440 disposed within controller 400.

Figure 6B:
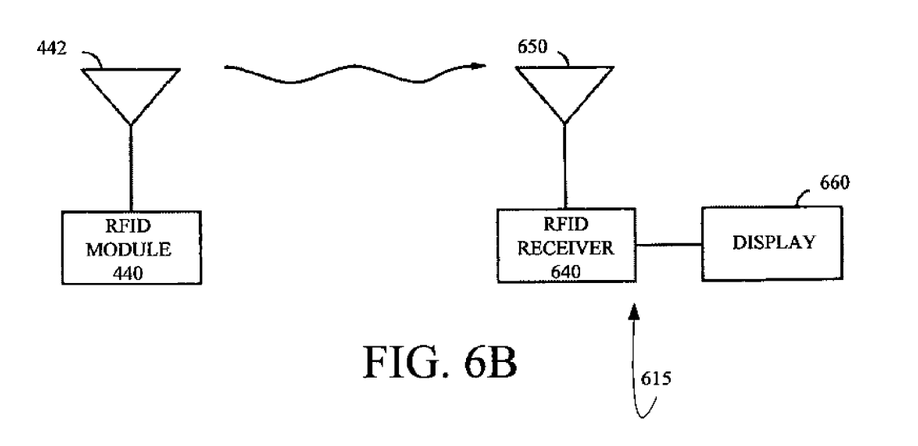
FIG. 6B is a block diagram showing a wireless visual display device used in the food preparation apparatus of FIGS. 2B and 2C.

In certain embodiments, RFID module 440 wireless provides to display apparatus 615 the total weight of material disposed in portable feed bin 610, the weight percentage of feed 150 disposed in portable feed bin 610, the weight percentage of Feed Additive A disposed in portable feed bin 610, the weight percentage of Feed Additive B disposed in portable feed bin 610, and the weight percentage of Feed Additive C disposed in portable feed bin 610. That information is then displayed on display device 660.

Figure 3C:
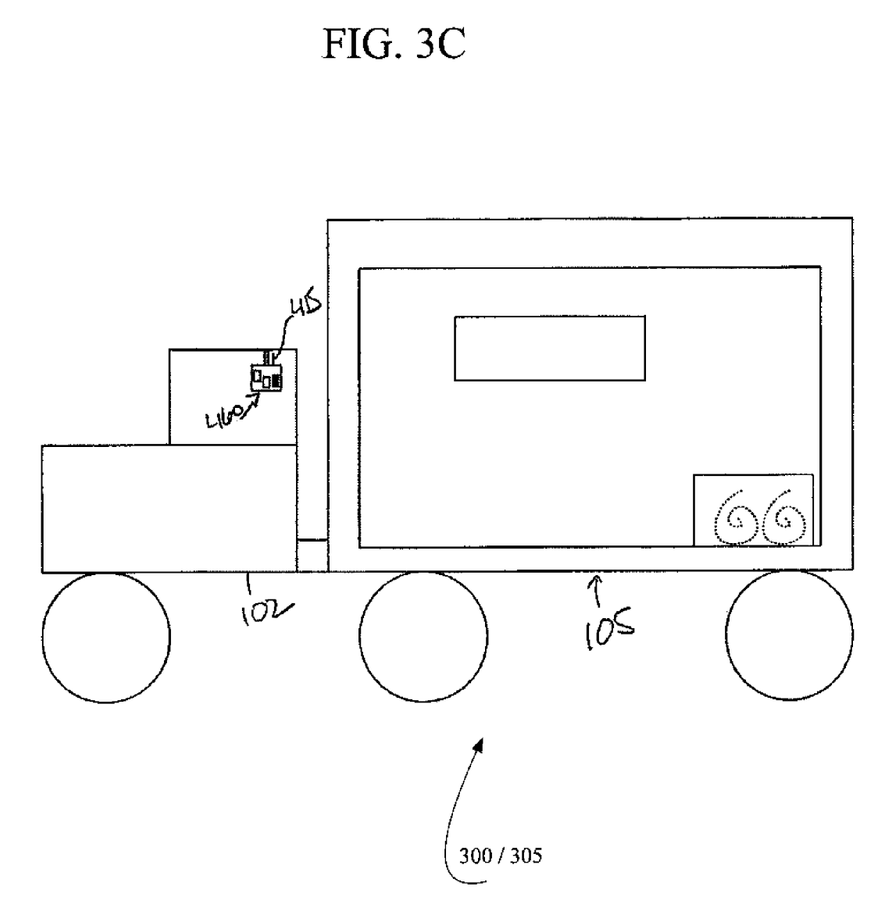
FIG. 3C illustrates certain wireless communication devices and method used in the apparatus of FIGS. 3A and 3B.

In operation, an operator positions Applicants' vehicle 300, or Applicants' trailer 305, adjacent to a designated feeding site. In certain embodiments, the operator signals controller 400 to begin delivery of a pre-set feed formulation to the selected feed bunk by activating a switch/touch screen/icon disposed on external controller 460 (FIG. 3C). In certain embodiments, controller 400 verifies using UPS module 430 and the feeding site location recited in database 426. UPS module 430, using optional antenna 432, determines the actual location of vehicle 300 and compares that actual location to the location for the selected feed bunk recited in database 426. In certain embodiments, controller 400 verifies the formulation using RFID module 440, wherein module 440 emits an interrogating signal and receives using antenna 442 a response signal identifying the adjacent feed bunk.

In certain embodiments, the method compares the actual feeding site location with the designated feeding site location recited in database 426. If the actual feeding site location differs from the designated feeding site location, the method generates a Location Alert. The Location Alert is added to database 426. In certain embodiments, controller 400 provides the Location Alert to external controller 460, and external controller 460 emits an audible alert and/or visually displays an alert message. In certain embodiments, the Location Alert is provided wirelessly to a central feed lot server using WI-FI module 450 and optional antenna 452, and/or to a portable feed bin display device using RFID module 440.

Figure 5:
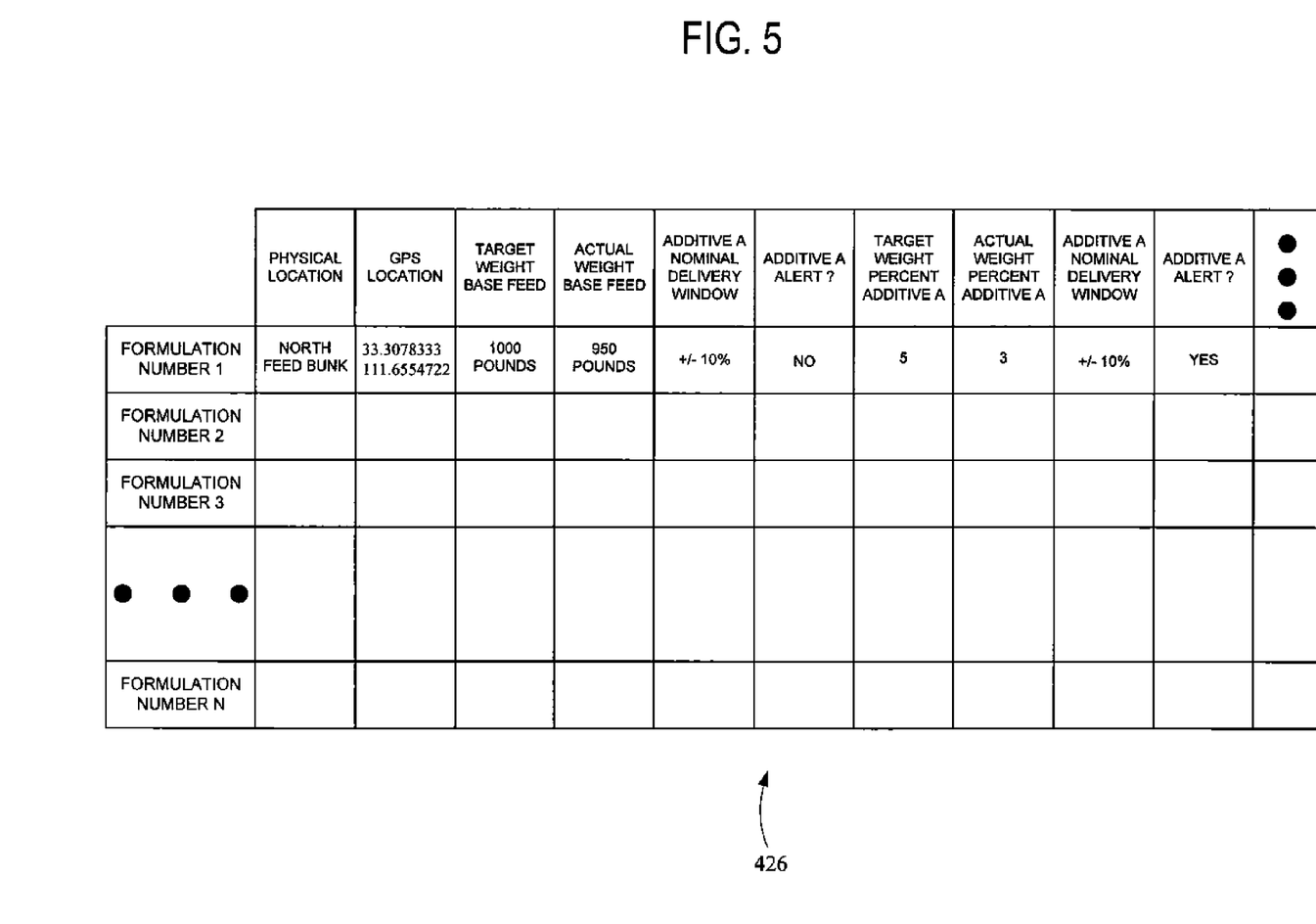
FIG. 5 schematically depicts a database aspect of the invention.

In the illustrated embodiment of FIG. 5, database 426 comprises (N) formulations. Referring now to FIGS. 2, 4, and 5, in the illustrated embodiment of FIG. 5, database 426 recites that a pre-set quantity of 1000 pounds of feed 150 are targeted for delivery to the North Feed Blunk. Database 426 further recites that 950 pounds were actually delivered to the North Feed Bunk. In certain embodiments of Applicants' apparatus and method, measurement device 252 determines the amount of base feed 150 delivered at designated location.

Processor 410 enters that actual delivered amount into database 426. In certain embodiments, the actual weight of feed delivered is wirelessly provided to a central feed lot server using WI-FI module 450 and optional antenna 452, and/or to a portable feed bin display device using RFID module 440.

Further in the illustrated embodiment database 426 in FIG. 5, the nominal delivery window for delivery of base feed to the North Feed Bunk is +/− ten percent (10%) Because the actual amount delivered, i.e. 950 pounds, is within the pre-determined nominal window of 900 pounds to 1100 pounds, no alert was generated with respect to the amount of base feed delivered to the North Feed Bunk.

Further in the illustrated embodiment database 426 in FIG. 5, Additive A is to be added to the base feed to give a loading of 5 weight percent. In certain embodiments, controller 400 determines the weight of Additive A to be added to the base feed using database 426. Controller 400 opens valve 274, thereby causing Additive A to flow from container 272, through valve 274, through conduit 276, and into the mixing assembly 210, or a portable feed bin. Measurement device 254 determines the actual amount of Additive A added to the base feed delivered to the North Feed Bunk, and provides that weight to controller 400. In certain embodiments, the actual weight of Additive A added is wirelessly provided to a central feed lot server using WI-FI module 450 and optional antenna 452, and/or to a portable feed bin display device using RFID module 440.

In certain embodiments, controller 400 calculates a weight percent loading of Additive A in the base feed using the weights provided by measurement devices 252 and 254. In certain embodiments, controller 400 then inserts the actual weight percent of Additive A in the base feed into database 426. In certain embodiments, controller 400 further determines if the actual loading of Additive A is within the nominal window for Additive A.

Similarly, controller 400 calculates a weight percent loading of Additive B in the base feed using the weights provided by measurement devices 254 and 256, and a weight percent loading of Additive C in the base feed using the weights provided by measurement devices 256 and 258.

The nominal delivery window for Additive A at the North Feed Bunk is +/− ten percent (10%). Because the actual 3 weight percent loading of Additive A is outside the pre-determined nominal window of 4.5 weight percent to 5.5 weight percent, in certain embodiments, controller 400 generates an Additive A Alert with respect to the amount of added to the base feed delivered to the North Feed Bunk. The Additive A Alert is added to database 426. In certain embodiments, controller 400 provides the Additive A Alert to external controller 460, and external controller 460 emits an audible alert and/or visually displays an alert message. In certain embodiments, the Additive A Alert is provided wirelessly to a central feed lot server using WI-FI module 450 and optional antenna 452, and/or to a portable feed bin display device using RFID module 440.

Controller 400 similarly determines the loadings of additional additives, such as for example Additive B and/or Additive C, using database 426, and opens the one or more corresponding valves, such as valves 284 and/or 294. Weigh cells 256 and/or 258 determine the actual weights of Additives B and C, respectively, added to the feed formulation, and provide those actual weights to controller 400. Controller 400 then calculates the actual weight percent loadings of Additives B and/or C, determines if the actual weight percent loadings fall within pre-set nominal windows, and optionally generates, records, and provides an alert for Additive B and/or Additive C if the actual loadings are not within the designated preset nominal windows. In certain embodiments, the Additive B Alert and/or Additive C Alert is provided wirelessly to a central feed lot server using WI-FI module 450 and optional antenna 452, and/or to a portable feed bin display device using RFID module 440.

In certain embodiments, instructions, such as instructions 424 (FIG. 4) residing in computer readable medium 420 (FIG. 4), are executed by a processor, such as processor 410 (FIG. 4), to prepare and dispense a designated feed composition at a designated feeding site using Applicants' portable feed preparation apparatus.

While the preferred embodiments of the present invention have been illustrated in detail, it should be apparent that modifications and adaptations to those embodiments may occur to one skilled in the art without departing from the scope of the present invention.

We claim:

1. A portable feed preparation apparatus, comprising:
   a feed container;
   an input auger;
   a mixing auger;
   an output auger;
   wherein said input auger is configured to deliver a feed from said feed container to said mixing auger, and said mixing auger is configured to convey said feed in combination with one or more feed additives to said output auger;
   a first feed additive assembly comprising a first feed additive reservoir and a first conduit interconnecting said first feed additive reservoir and a first location on a feed conveying assembly comprising said mixing auger; and
   a second feed additive assembly comprising a second feed additive reservoir and a second conduit interconnecting said second feed additive reservoir and a second location on said feed conveying assembly, wherein said second location differs from said first location.

2. The portable feed preparation apparatus of claim 1, further comprising:

a first weigh cell disposed on said feed conveying assembly below said first location to determine an actual weight percent of a first feed additive added to said feed;

a second weigh cell disposed on said feed conveying assembly below said second location to determine an actual weight percent of a second feed additive added to said feed;

a first controller;

a first communication link interconnecting said first controller and said first weigh cell;

a second communication link interconnecting said first controller and said second weigh cell.

3. The portable feed preparation apparatus of claim 2, further comprising:

a third feed additive assembly comprising a third feed additive reservoir and a third conduit interconnecting said third feed additive reservoir and a third location on said feed conveying assembly, wherein third second location differs from said first location and from said second location;

a third weigh cell disposed on said feed conveying assembly below said third location; and a third communication link interconnecting said first controller and said first weigh cell.

4. The portable feed preparation apparatus of claim 3, further comprising:

a motor coupled to said mixing auger;

a fourth communication link interconnecting said motor and said first controller.

5. The portable feed preparation apparatus of claim 4, further comprising:

a first valve disposed in said first conduit; and a fifth communication link interconnecting said first valve and said first controller.

6. The portable feed preparation apparatus of claim 5, further comprising:

a second valve disposed in said second conduit; and a sixth communication link interconnecting said second valve and said first controller.

7. The portable feed preparation apparatus of claim 6, further comprising:

a third valve disposed in said third conduit; and a seventh communication link interconnecting said third valve and said first controller.

8. The portable feed preparation apparatus of claim 7, wherein said first controller comprises a processor, further comprising:

a plurality of wheels; and an internal combustion engine operably coupled to said plurality of wheels;

a driver's cab;

a second controller disposed in said driver's cab;

an eighth communication link interconnecting said second controller and said processor.

9. The portable feed preparation apparatus of claim 8, wherein said eighth communication link is wireless.

* * * * *